Sept. 19, 1961   B. F. FROEHLICH   3,000,469
ROTARY WORK HOLDER

Filed Dec. 17, 1958   3 Sheets-Sheet 1

INVENTOR.
BERNARD F. FROEHLICH
BY Jugelter & Jugelter
Attys.

Sept. 19, 1961  B. F. FROEHLICH  3,000,469
ROTARY WORK HOLDER
Filed Dec. 17, 1958  3 Sheets-Sheet 2
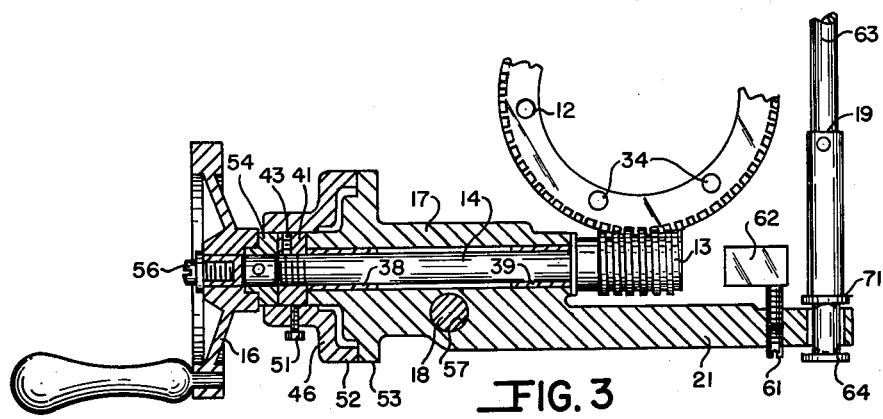
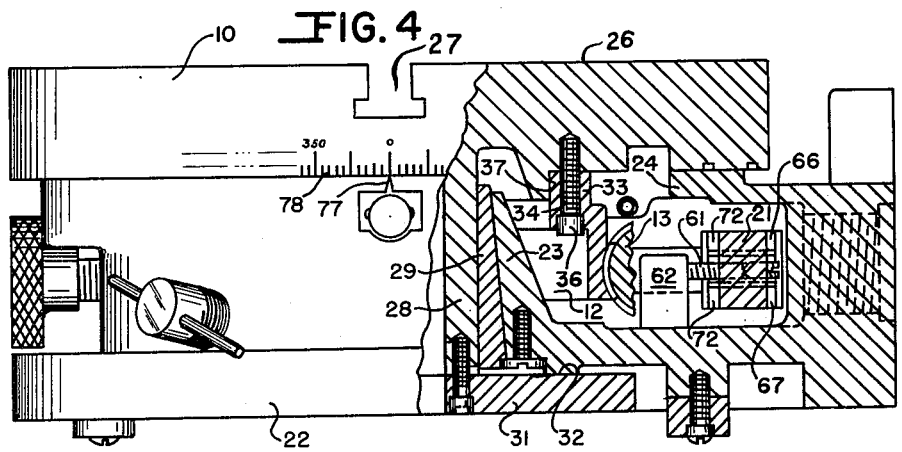
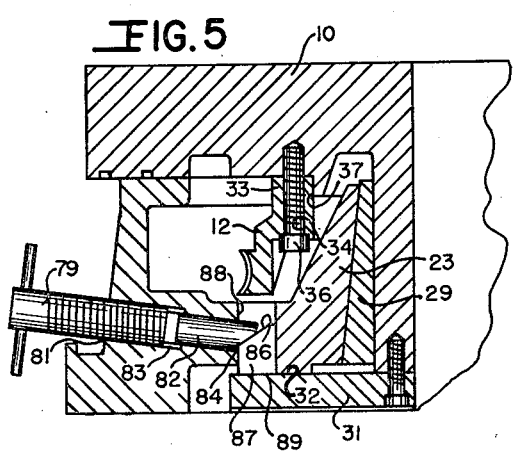
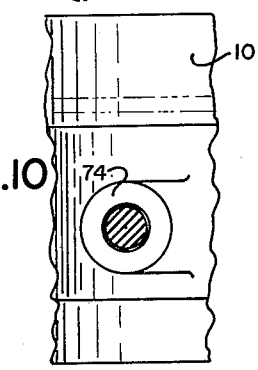
INVENTOR.
BERNARD F. FROEHLICH
BY Jugelter & Jugelter
Attys.

Sept. 19, 1961  B. F. FROEHLICH  3,000,469
ROTARY WORK HOLDER

Filed Dec. 17, 1958  3 Sheets-Sheet 3

INVENTOR.
BERNARD F. FROEHLICH
BY Gugelter & Gugelter
Attys.

3,000,469
ROTARY WORK HOLDER
Bernard F. Froehlich, Colerain Township, Hamilton County, Ohio (% The Troyke Mfg. Co., 11294 Orchard St., Sharonville, Ohio)
Filed Dec. 17, 1958, Ser. No. 781,147
1 Claim. (Cl. 188—71)

This invention relates to a rotary work holder or table for a machine tool, or the like.

Rotary tables for machine tools must be adjustable accurately for small angular distances and must also be turnable through large angular distances. An object of this invention is to provide a rotary table having a releasable drive which effects accurate adjustment of the table through small angular distances and which can readily be released in order that the table can be turned quickly through large angular distances.

A further object of this invention is to provide an indexing table of this type having a worm and worm wheel drive which turn the table accurately through small angular distances in combination with means for releasing the worm from the worm wheel when the table is to be rapidly turned through a greater angular distance.

A further object of this invention is to provide a rotary table of this type in which the worm is mounted on a shaft which shaft not only can turn on its axis, but which also can be swung pivotally in a direction to release the worm from the worm wheel when the table is to be rapidly turned.

The above and other objects and features of the invention will be apparent to those skilled in the art to which this invention pertains from the following detailed description and the drawings, in which:

FIG. 3 is a somewhat schematic sectional view showing details of construction of a worm and worm supporting mechanism which form a part of the indexing table, details of a base being omitted for clarity;

FIG. 4 is a view partly in side elevation and partly in section of the rotary table, the section being taken generally along the line 4—4 in FIG. 1;

FIG. 5 is a fragmentary view in section taken on the line 5—5 in FIG. 1;

FIG. 10 is a fragmentary view in section taken on the line 10—10 in FIG. 1; and

In the following detailed description, and the drawings, like reference characters indicate like parts.

Figure 1:
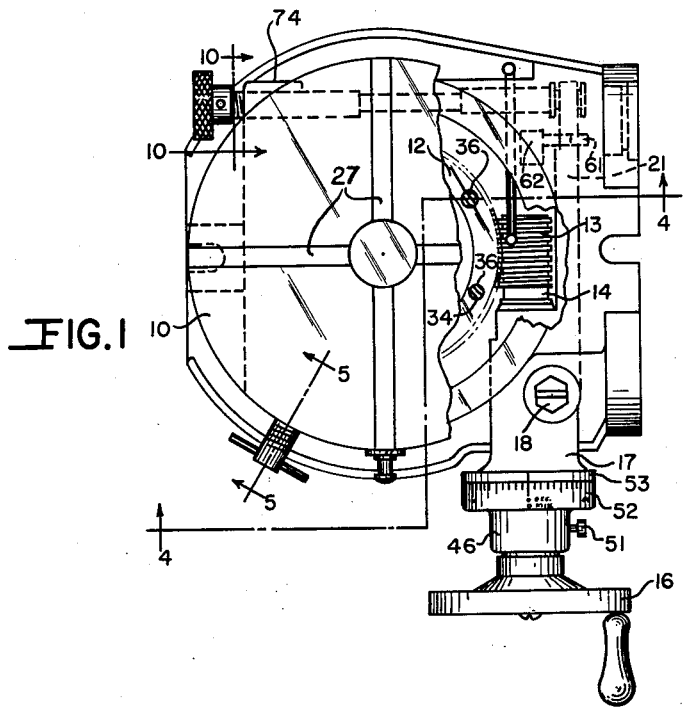
FIGURE 1 is a top plan view of a rotary table constructed in accordance with an embodiment of this invention, a portion of the table thereof being broken away to reveal internal structural details.
Figure 2:
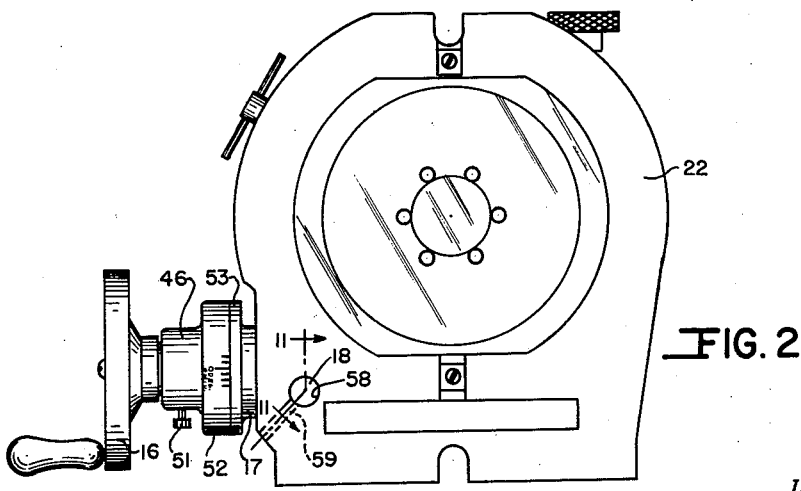
FIG. 2 is a bottom plan view of the rotary table illustrated in FIG. 1.

As shown in FIG. 1, a work-table for a machine tool is shown which includes a table 10. A worm wheel 12 is attached to the table and turns therewith. A worm 13 can mesh with the worm wheel 12. The worm 13 is mounted on a shaft 14 which can be turned by a hand wheel 16 to turn the table through small angular distances. The worm shaft 14 is mounted in a bearing sleeve 17. When the table is to be turned rapidly through a large, angular distance, the bearing sleeve is swung upon a pivot stud 18 from the position shown in FIGS. 1 and 3, to the position shown in FIG. 6, at which the worm is released from the worm wheel. The bearing sleeve is swung by operation of an activating rod assembly 19 which has an end portion which engages an arm 21. The arm 21 is an integral portion of the bearing sleeve 17. When the table has been turned to an approximately correct position, the worm wheel is returned to the worm engaging position, and final adjustment is made by turning the hand wheel 16.

The device which has been described in general terms hereinabove, will now be described in greater detail.

The table 10 is mounted on a base 22 (FIG. 4) which includes a central, hollow bearing portion 23 and an upwardly extending table-supporting annular flange 24. Other portions of the base will be described in more detail hereinafter.

The table 10 includes a flat face portion 26 having an outer edge which rests on the base flange 24. Appropriate T-shaped slots 27 are formed in the face portion 26 to which a workpiece can be attached. A journal portion 28 of the table extends downwardly from the face portion inside the bearing portion 23 of the base. A bushing 29 is disposed between the bearing portion 23 of the base and the journal portion 28 of the table. A brake plate 31 is attached to the lower end of the journal portion 28 of the table and holds the table and base in assembled relation. An annular rib 32 on the underside of the base 22 is engaged by and forms the bearing for the brake plate.

The worm wheel 12 is annular in shape, and, as shown in FIGS. 4 and 5, includes a main worm portion and an upwardly extending flange 33. Bores 34 in the flange 33 receive cap screws 36 which attach the worm wheel 12 to the underside of the table. A shoulder 37 is formed on the underside of the table and engages the flange 33 to properly center the worm wheel.

As already indicated, the worm shaft 14 (FIG. 3) is rotatably mounted in the bearing sleeve 17. Bushings 38 and 39 (FIG. 3) inside the bearing sleeve 17, support the shaft 14. A nut 41 mounted on the shaft 14 is drawn up sufficiently tightly against an end of the bearing sleeve 17 to hold the shaft 14 against endwise play. A set screw 43 holds the nut 41 in position. A bell-shaped housing 46 is mounted on the nut 41 and is held in adjustable position thereon by thumb screw 51. The housing 46 has an annular flange 52 (see FIG. 1) which engages flatwise against an annular flange 53 on the bearing sleeve 17. As shown in FIG. 1, the housing flange 52 carries graduations which can register with an index mark on the sleeve flange 43 to indicate the angular position of the worm shaft 14 and the worm 13. A hub 54 (FIG. 3) is pinned to the worm shaft 14. The hand wheel 16 is mounted on and turns with the hub 54. A screw 56, which is received in an axial threaded bore in the shaft 14, holds the handwheel in position on the hub.

Figure 11:
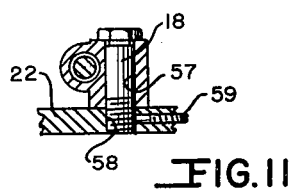
FIG. 11 is a view or section taken on line 11—11 in FIG. 2.

As shown in FIGS. 3 and 11, an upright bore 57 is provided in the bearing sleeve 17 spaced from and extending transversely of the axis in the worm shaft 14. The pivot stud 18 extends through the upright bore 57 and is mounted in a threaded bore 58 in the base 22. The pivot stud 18 is held in place by a set screw 59. The pivot stud 18 forms a pivot on which the bearing sleeve can be swung together with the worm shaft 14 and the worm 13 to cause the worm 13 to engage the worm wheel 12 or to disengage the worm wheel.

The bearing sleeve is swung by means of the arm 21 which extends substantially parallel to the axis of the bearing sleeve spaced therefrom. Screws 61 mounted on the arm 21 can engage a block 62, which is integral with the base 22, as shown in FIG. 4, to limit swinging of the bearing sleeve in a direction toward the worm wheel. The screw 61 is set to engage the block 62 when the worm and worm wheel are in proper mesh.

Figure 6:
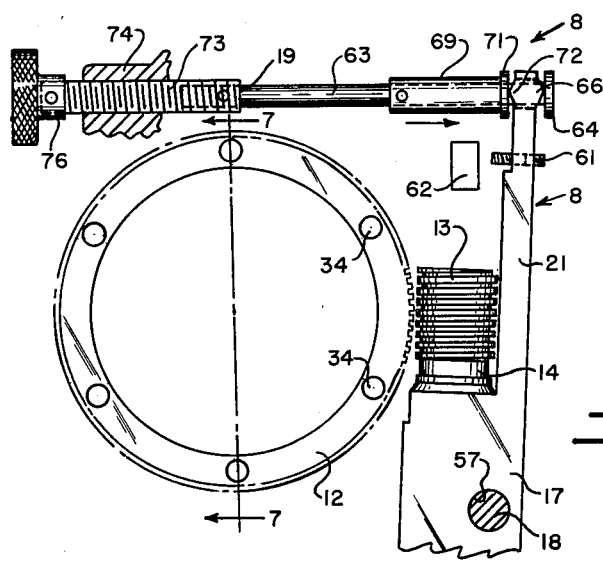
FIG. 6 is a somewhat schematic plan view showing the relationship of the worm and worm wheel when in released position, details of the base being omitted for clarity.
Figure 7:
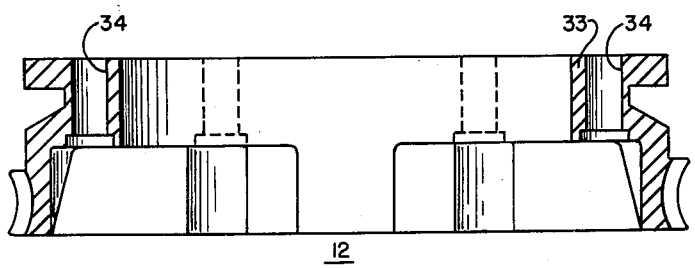
FIG. 7 is a view in section of the worm wheel taken on the line 7—7 in FIG. 6.
Figure 8:
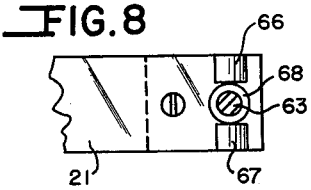
FIG. 8 is a fragmentary view in section taken on the line 8—8 in FIG. 6.
Figure 9:
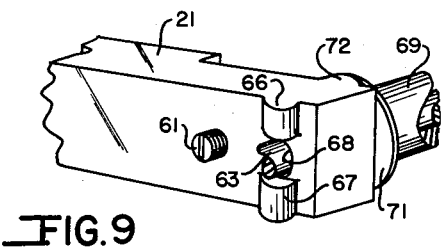
FIG. 9 is a fragmentary perspective view showing a portion of an arm of a worm supporting member and of a transverse shaft which forms a part of the device.

As already indicated, the arm 21 is driven in and out by the rod assembly 19 (FIG. 6). The rod assembly 19 includes a main rod 63 having a head 64 engaging bosses 66 and 67 (FIGS. 8 and 9) which are integral with the arm 21. As shown in FIGS. 8 and 9, the main rod 63 of the rod assembly extends through a transverse bore 68 in the arm 21. Transverse bore 68 is larger than the diameter of rod 63.

A sleeve 69 is pinned to the main rod, as indicated in FIG. 6. The sleeve 69 has a head 71 which engages bosses 72 on the arm 21. An exteriorly threaded member 73 is mounted on the main rod 63 and pinned thereto. The member 73 is threaded in a boss 74 which forms a portion of the base. A knurled cap 76 is pinned to the threaded member 73 for use in turning the rod assembly. When the rod assembly is turned, the arm 21 is swung out and in together with the bearing sleeve 17 and the worm 13.

The work table is turned to an approximate position as indicated by a pointer 77 (FIG. 4) attached to the base and and scale indicia 78 on the table, and final adjustment is made by reference to the graduations and index marks on the flanges 52 and 53 (FIG. 1). Then the table is locked in position by a locking mechanism shown most clearly in FIG. 5. The locking mechanism includes a screw 79 mounted in a threaded bore 81 in the base. A brake actuating plug 82 is mounted in an extension 83 of the bore 81 and can be engaged by the screw 79 so that, when the screw 79 is turned inwardly, the plug 82 is driven to the right, as shown in FIG. 5. A cam surface 84 on the plug 82 engages a cam surface 86 on a second or brake plug 87. The brake plug 87 is mounted in an upright bore 88 in the base 22. The brake plug 87 has a lower horizontal face 89 which engages the brake plate 31. When the screw 77 is turned inwardly, the brake plug 87 is driven downwardly to grip the brake plate 31 and lock the table in predetermined position.

When the table is to be swung or turned through a small arc, the hand wheel 16 can be turned to adjust the table. When the table is to be swung through a larger arc, the rod assembly 19 is turned to bring the worm out of engagement with the worm wheel. Then, when the table has been swung to its approximate position, the rod assembly is turned in the opposite direction to bring the worm back into mesh with the worm wheel. The screw 61 (FIGS. 3, 4 and 6) limits movement of the rod assembly and the worm 13 so that proper meshing is assured. Then the final adjustment can be made by turning the hand wheel 16 (FIGS. 1 and 3).

The rotary table which has been described above and illustrated in the drawings, is subject to structural modification without departing from the spirit and scope of the appended claim.

Having described my invention, what I claim as new, and desire to secure by Letters Patent is:

In a rotary work holder which comprises a base having an upright central bearing opening, a table rotatably mounted on said base, and a journal member mounted on the table and extending downwardly through said opening, a brake which comprises a brake plate attached to the journal portion remote from the table and engageable with the base surrounding the bearing opening to hold the table in position on the base, the brake plate having a braking face extending normally to the axis of the journal member, there being an upright bore in the base overlying the braking face of the brake plate, said upright bore extending parallel to the axis of the journal member, a brake plug mounted in the upright bore and engageable with the braking face of the brake plate, there being a transverse bore in the base intersecting the upright bore, a brake actuating plug mounted in said transverse bore and engageable with the brake plug, the brake plug having a flat wedging face extending at an angle of approximately 30° to the upright bore, the brake actuating plug having a flat wedging face complementary to and engaging the wedging face of the brake plug, and releasable means for urging the brake actuating plug lengthwise of the transverse bore and in a direction to hold the brake plug against the brake plate and lock the table against rotation.

References Cited in the file of this patent

UNITED STATES PATENTS

| | | |
|---|---|---|
| 1,420,826 | Fernholtz | June 27, 1922 |
| 1,936,943 | Kohr | Nov. 28, 1933 |
| 2,610,552 | Victory | Sept. 16, 1952 |
| 2,804,781 | Lietz | Sept. 3, 1957 |